United States Patent
Ito et al.

(10) Patent No.: US 7,070,380 B2
(45) Date of Patent: Jul. 4, 2006

(54) MACHINING APPARATUS

(75) Inventors: Yasushi Ito, Ebina (JP); Masuo Yamauchi, Ebina (JP); Norio Michigami, Ebina (JP)

(73) Assignee: Hitachi Via Mechanics, Ltd., Ebina (JP)

( * ) Notice: Subject to any disclaimer, the term of this patent is extended or adjusted under 35 U.S.C. 154(b) by 98 days.

(21) Appl. No.: 10/935,217

(22) Filed: Sep. 8, 2004

(65) Prior Publication Data
US 2005/0111958 A1    May 26, 2005

(30) Foreign Application Priority Data
Nov. 21, 2003    (JP)    ............................. 2003-392535

(51) Int. Cl.
  *B65H 1/00*  (2006.01)
(52) U.S. Cl. .............................. 414/222.01; 198/346.1; 198/346.2; 198/468.6
(58) Field of Classification Search ........... 414/222.01, 414/222.07, 222.08, 223.02, 225.01, 749.1, 414/751.1, 752.1; 198/346.1, 346.2, 468.4, 198/468.6
See application file for complete search history.

(56) References Cited

U.S. PATENT DOCUMENTS
4,795,021 A * 1/1989 Moller .................... 198/346.1

FOREIGN PATENT DOCUMENTS
JP    2001-139170    5/2001

* cited by examiner

*Primary Examiner*—Donald W. Underwood
(74) *Attorney, Agent, or Firm*—Crowell & Moring LLP

(57) ABSTRACT

In a laser beam machining apparatus, a work supply station is disposed on one side of a laser beam machining apparatus body, and a work holding station is disposed on the other side of the laser beam machining apparatus body. Each of the work supply station and the work holding station is provided with a means for removing a work vertically and positioning the work w in a horizontal state on a machining table. A stocker including works disposed therein is disposed in the work supply station, and a stocker including no work disposed therein is disposed in the work holding station, so that a surface of a work w disposed in the stocker is machined, and the machined work is disposed in the stocker. When the machining of the works disposed in the stocker has been finished, the stocker is rotated through 180 degrees about a vertical axis by a lifter. Then, a back of the work is machined according to a procedure reverse from the above-described machining procedure. When the machining of all the works has been completed, the works are returned to the stocker. Thus, the machining apparatus is smaller in size and capable of carrying out the machining with an enhanced working efficiency.

2 Claims, 7 Drawing Sheets

US 7,070,380 B2

MACHINING APPARATUS

BACKGROUND OF THE INVENTION

1. Field of the Invention

The present invention relates to a machining apparatus in which a work retained in a stocker is removed therefrom and transported to a machining area, and the machined work is returned from the machining area to the stocker.

2. Description of the Related Art

When a plate-shaped work is to be machined, a plurality of works are previously stacked horizontally in a thickness-wise direction on one side of the machining area. The uppermost work is removed therefrom and transported to the machining area, and the machined works are sequentially transported to the other side of the machining area and stacked one on another. If the works are processed in this manner, the working efficiency can be enhanced (see JP-A-2001-139170).

However, not only one surface (a front surface) but also a rear surface of the work must be machined in some cases. In such a case, it is performed according to the above-described conventional technique that the works machined and stacked are turned over upside and downside by an operator and moved again to the machining area, where they are machined. For this reason, the working efficiency could not be enhanced.

If an upside-downside turning device for the works is provided, so that the works whose surfaces have been machined are turned over upside-downside, one by one or all together, the size of the apparatus is increased, and the working efficiency is reduced.

SUMMARY OF THE INVENTION

Accordingly, it is an object of the present invention to provide a machining apparatus, wherein the problems associated with the above-described prior art are solved; the size of the apparatus is made smaller; and the working efficiency can be enhanced.

To achieve the above object, according to the present invention, there is provided a machining apparatus comprising a work removing means, a rotating means for rotating a removed work, a work transporting means, and a work machining means, in which a work supported vertically is removed from a stocker disposed on one side of a machining area by the removing means, the removed work is rotated through 90 degrees in a thickness-wise direction by the rotating means to a horizontal attitude, and the horizontalized work is positioned in the machining area by the transporting means, where it is machined, wherein the apparatus further includes a stocker-rotating means adapted to support the stocker and rotate it through 180 degrees with respect to a vertical axis.

With the above arrangement, the work can be turned upside and downside by only rotating the stocker with respect to the vertical axis and hence, the size of the apparatus can be reduced. In addition, opposite sides of the work can be machined continuously, leading to an enhancement in working efficiency.

The above and other objects, features and advantages of the invention will become apparent from the following description of the preferred embodiment taken in conjunction with the accompanying drawings.

DESCRIPTION OF THE PREFERRED EMBODIMENT

The present invention will now be described according to an embodiment shown in the accompanying drawings.

Figure 1:
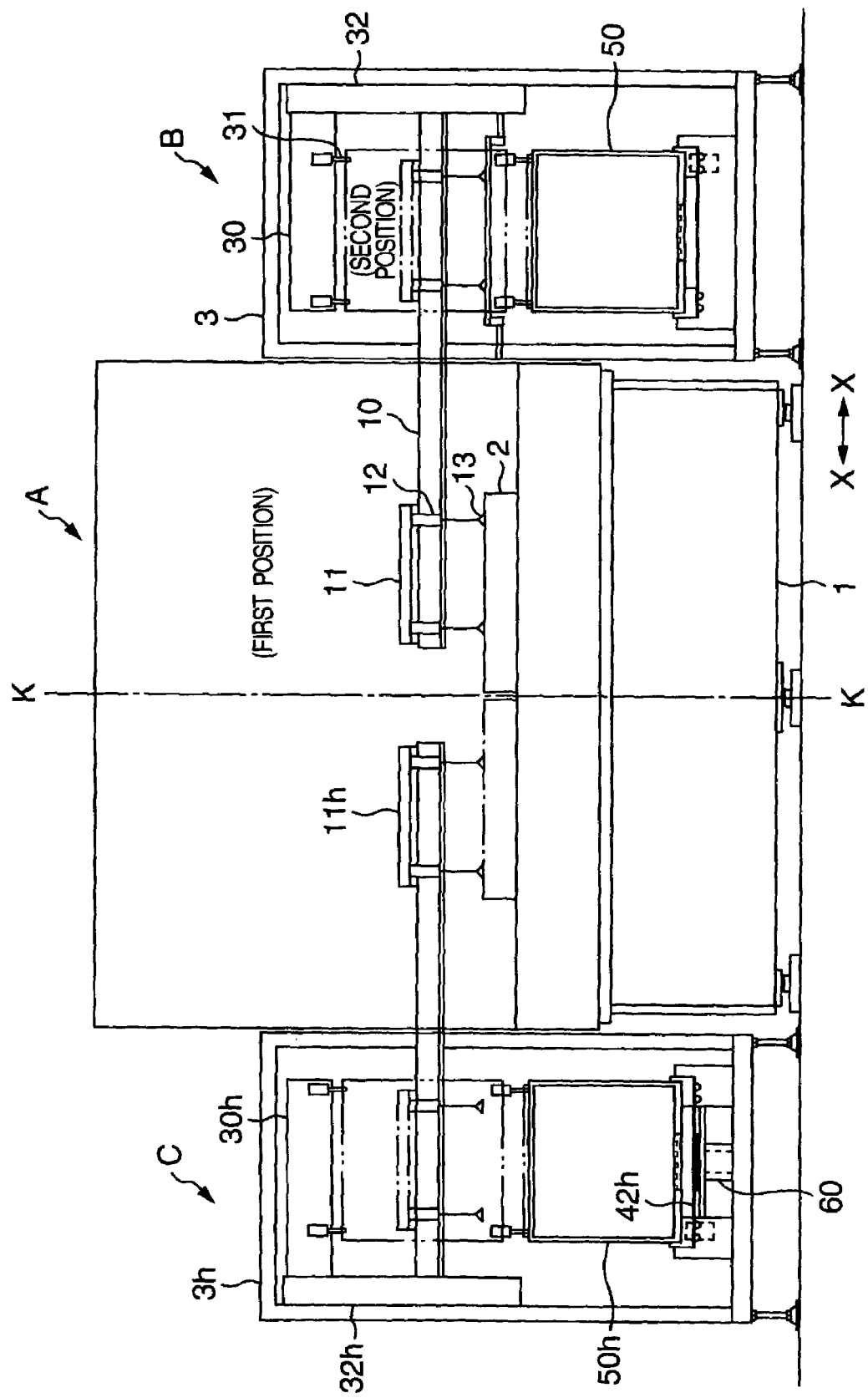
FIG. 1 is a partially sectional front view showing the arrangement of a laser beam machining apparatus according to the present invention.

As shown in FIG. 1, a laser beam machining apparatus is comprised of a laser beam machining apparatus body A, a work supply station B and a work holding station C.

A machining table 2 capable of being positioned in an X-Y direction is disposed on a base 1 of the laser beam machining apparatus body A, and a machining station (not shown) is disposed above the machining table 2.

A rail 10 supported on a box 3 in the work supply station B overhangs above the machining table 2.

A slider 11 is capable of being positioned laterally on the rail 10 by a well-known moving means (not shown). It should be noted that a position shown by a solid line in FIG. 1 is a first position, and a position shown by a one-dot dashed line is a second position.

A plurality of (four in the illustrated embodiment) lifters 12 capable of being positioned vertically are disposed in the X-Y direction on the slider 11. Suction devices 13 are disposed at tip ends (lower ends) of the lifters 12, respectively. The suction devices 13 are connected to a vacuum source (not shown).

Figure 2:
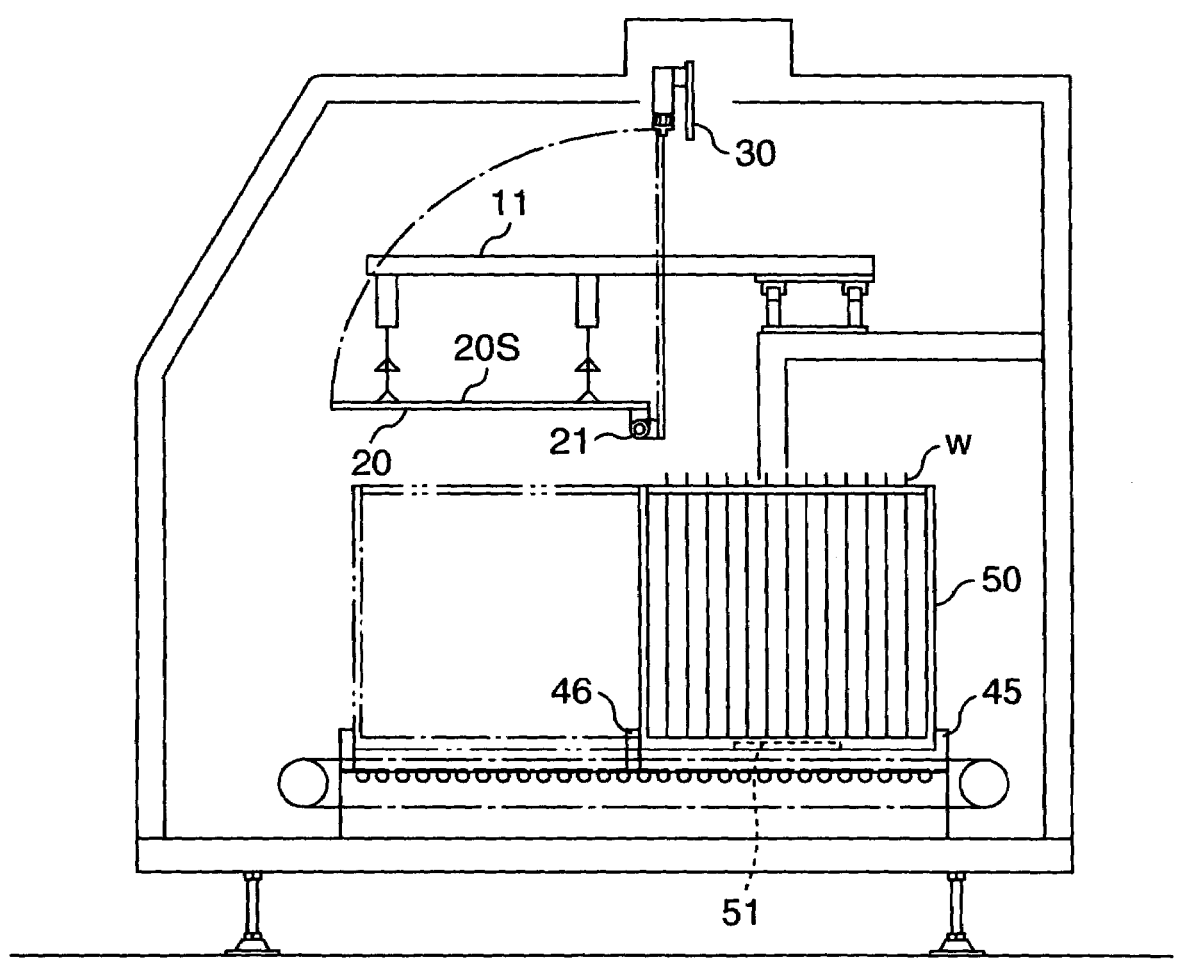
FIG. 2 is a right side elevational view of the laser beam machining apparatus according to the present invention.
Figure 3:
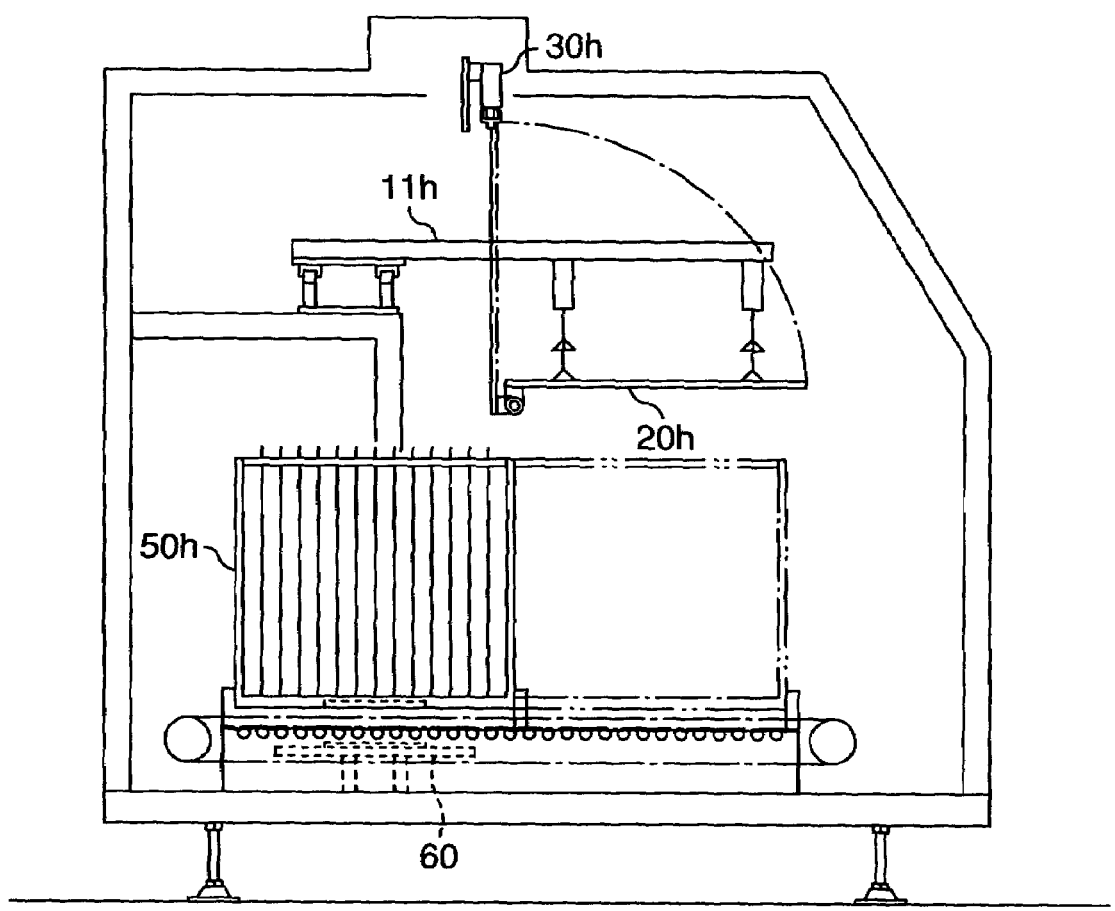
FIG. 3 is a left side elevational view of the laser beam machining apparatus according to the present invention.
Figure 4:
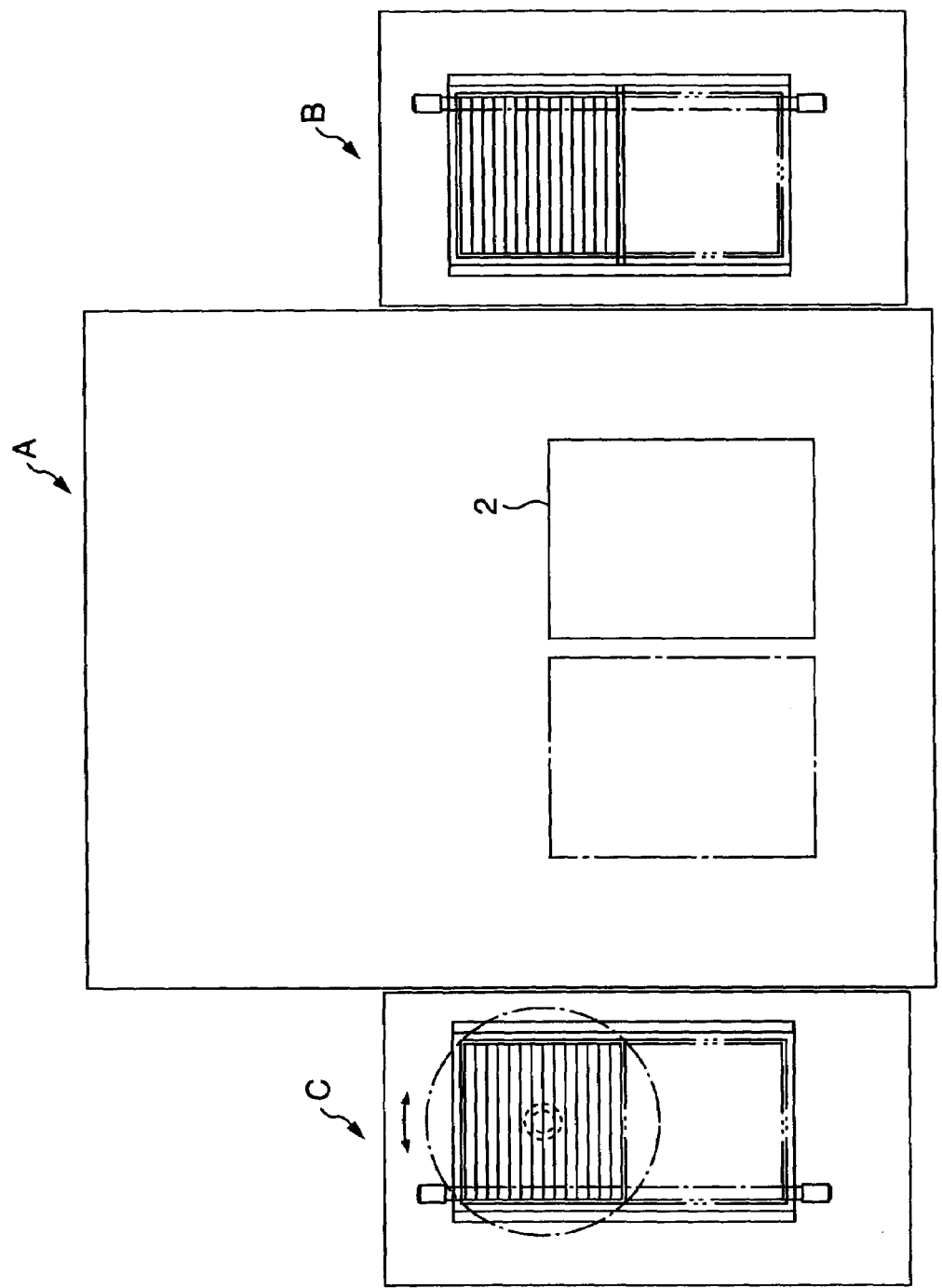
FIG. 4 is a plan view of the laser beam machining apparatus according to the present invention.

As shown in FIG. 2, a rotary plate 20 is disposed in the work supply station B. The rotary plate 20 can be rotated through 90 degrees from a horizontal position to a vertical position about a joint 21.

The joint 21 is positioned so as to bring a receiving surface 20s into contact with a back of a work W supported on a hanger 30 which will be described hereinafter, when the rotary plate 20 is positioned vertically. A plurality of dampers (not shown) are disposed on the rotary plate 20.

The hanger 30 provided with two dampers 31 is capable of being positioned vertically by a guide device 32.

Figure 5:
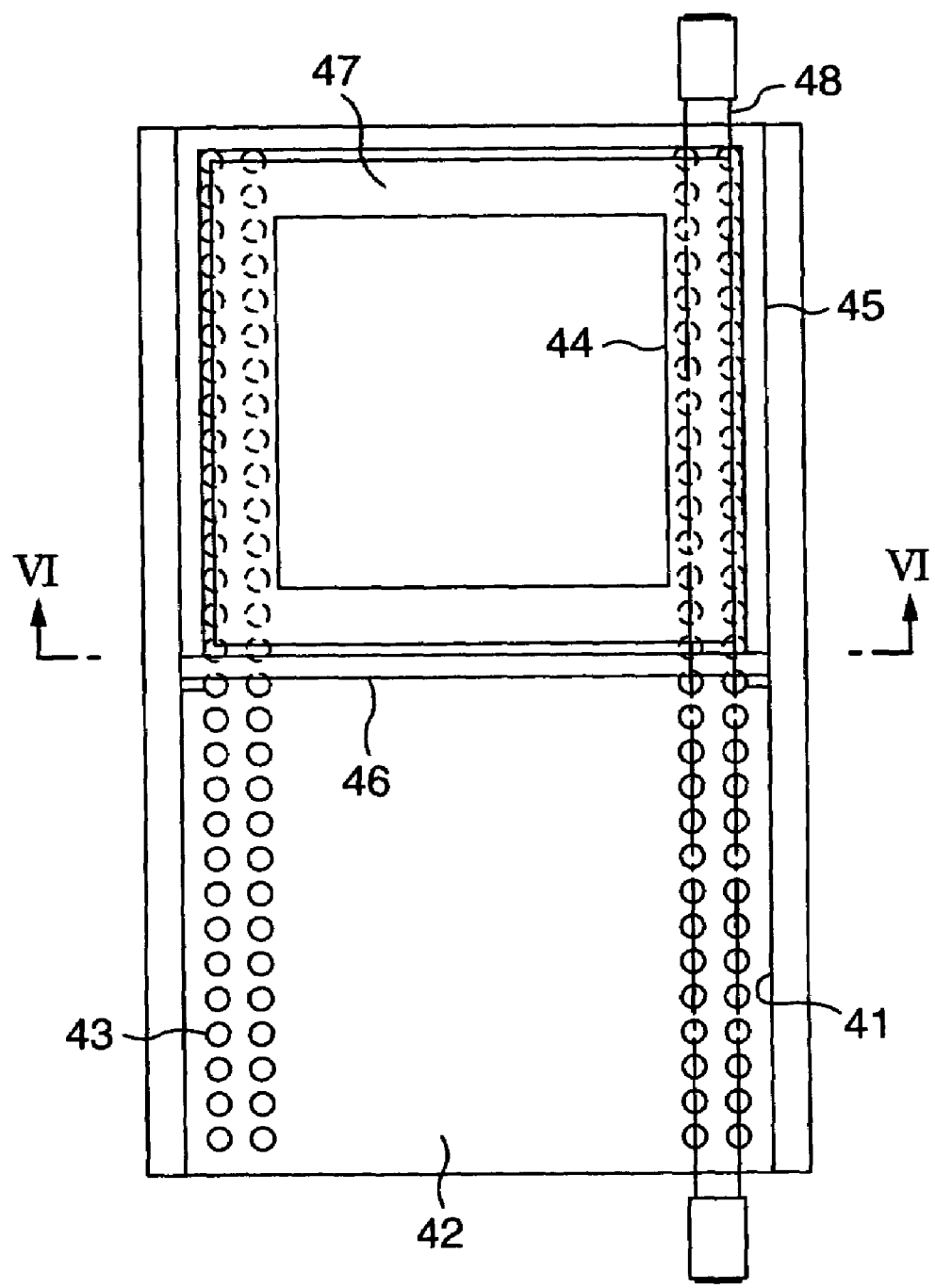
FIG. 5 is a plan view of a stocker-transporting portion of the laser beam machining apparatus according to the present invention.
Figure 6:
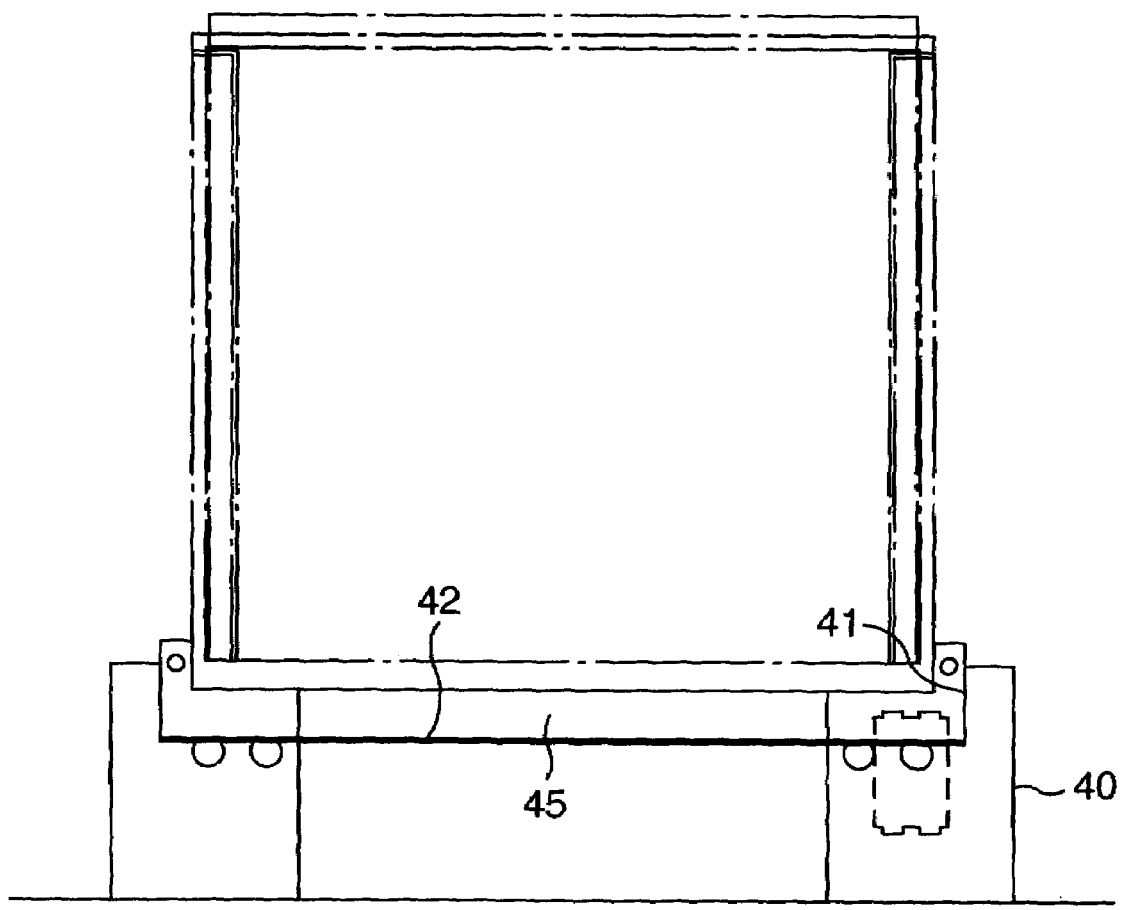
FIG. 6 is a sectional view taken along a line VI—VI in FIG. 5.
Figure 7:
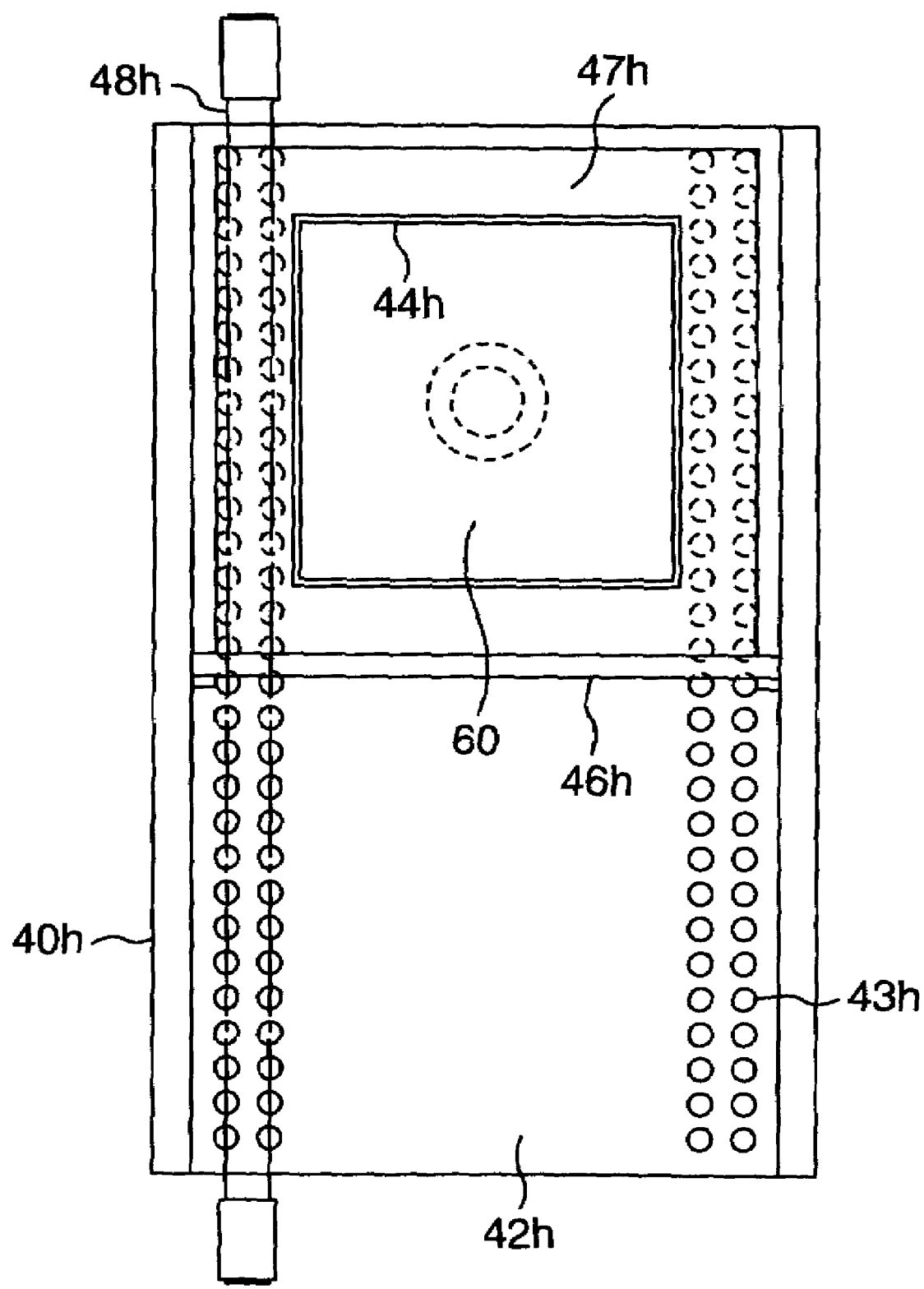
FIG. 7 is a plan view of a stocker retaining portion of the laser beam machining apparatus in accordance with the present invention.

As shown in FIGS. 5 and 6, a plurality of balls 43 are rotatably disposed on a bottom surface 42 of the guide device 40 formed with a groove 41. A square hole 44 is made at a predetermined position in the bottom surface 42. The square hole 44 is not always necessary for the work supply station B though.

A holder 45 is fitted in the groove 41. The three outer sides of the holder 45 and a front plate 46 form a recess 47. The front plate 46 can be removed from the holder 45 by removing bolts (not shown). Inside dimensions of an inner surface of the recess 47 in directions of Y-axis and X-axis are slightly larger than outside length of a stocker 50 in the directions of Y-axis and X-axis. The holder 45 is positioned in the direction of X-axis by a timing belt 48.

Works w are accommodated in vertical set-up states in the stocker 50. A recess 51 (shown in FIG. 2) is formed in a bottom plate of the stocker 50, so that a lifter 60 which will be described hereinafter is fitted into the recess 51.

Components of the work holding station C are either identical to those of the work supply station B, or mirror-image to those of the work supply station B with respect to a center axis K—K of the laser beam machining apparatus body A shown in FIG. 1, except that the lifter 60 is disposed. Therefore, these components are designated by the same reference characters affixed with suffix h, and the description of them is omitted.

A lifter 60 is disposed in the square hole 44h in the guide device 40h in the work holding station C, so that it can be lifted/lowered and rotated through 180 degrees. The surface of the lifter 60 lying in a standby position is at a location lower than a bottom surface 42h.

A procedure for supplying a work w to the machining table 2 and discharging the work w from the machining table 2 will be described below. An empty stocker 50h having no work w accommodated therein is disposed in the work holding station C.

(1) The holder 45 is moved to the left end in FIG. 2 (the position shown by a two-dot dashed line), and the front plate 46 is removed.

(2) The stocker 50 having the works w held thereon is brought into engagement with the recess 47, and the front plate 46 is then fixed to the holder 45.

(3) The stocker 50 is moved, and the work w at the right end in FIG. 2 is positioned at the location for removal by the hanger 30.

(4) The hanger 30 is lowered, and the work w is held by the damper 31 and thereafter, the hanger 30 is moved to a lift end.

(5) The rotary plate 20 is rotated vertically, and the work w is held by the damper (not shown).

(6) The damper 31 is opened, and the rotary plate 20 is then rotated horizontally.

(7) The slider 11 is moved to the second position, and the lifter 12 is lowered, whereby the work w is sucked by the suction devices 13.

(8) The damper of the rotary plate 20 is opened, and thereafter, the lifter 12 is lifted, and the slider 11 is moved to the first position. It should be noted that the machining table 2 is positioned in the first position.

(9) The lifter 12 is lowered, and the work w is placed onto the machining table 2.

(10) The work w is fixed to the machining table 2 by a means which is not shown, and the lifter 12 is then lifted with the absorption device 13 turned off.

The work w has been fixed to the machining table 2 by the above-described procedure and hence, is subjected to a machining similar to that in the prior art.

When the machining is thus finished, the following steps are carried out:

(11) The machining table 2 is positioned in the first position for the slider 11h (the position shown by the solid line in FIG. 1).

(12) The lifter 12h is lowered, and the work w held on the machining table 2 is held by the absorption device 13h.

(13) The holding means of the machining table 2 is opened and thereafter, the lifter 12h is lifted.

(14) Then, the work w, the machining of the surface of which has been completed, is accommodated in the stocker 50 by carrying out the steps (3) to (7) of the procedure backwards in the work holding station C. In parallel to this, a next work w is placed onto the machining table 2 through the steps (3) to (7) of the procedure in the work supply station B.

(15) Then, the steps (3) to (14) of the procedure are repeated, until all the works w accommodated in the stocker 50 are accommodated in the stocker 50h.

When all the works w accommodated in the stocker 50 have been accommodated in the stocker 50h, the following steps are carried out:

(16) The stocker 50h is moved, and the recess 51 is opposed to the lifter 60.

(17) The lifter 60 is moved, and the stocker 50h is withdrawn from the recess 47h. Thereafter, the lifter 60, i.e., the stocker 50h is rotated through 180 degrees with respect to a vertical axis.

(18) The lifter 60 is lowered.

A back surface of the work w is positioned on a front surface in FIG. 1 through the steps (16) to (18) of the procedure.

The work holding station C is also operable in the same way as the work supply station B at the steps (3) to (15) of the procedure, and the work supply station B is also operable in the same way as the work holding station C at the steps (3) to (15) of the procedure, and in this manner, the steps (3) to (15) of the procedure are repeated.

(19) When all the works w have been accommodated in the stocker 50, the stocker 50 is removed from the work supply station B.

In this embodiment, the work holding station C is provided and hence, the work-exchanging time can be shortened.

Alternatively, a lifter 60 may be also disposed in the work supply station B.

Yet alternatively, the machining apparatus may be constructed so that a lifter 60 is disposed in the work supply station B without provision of the work holding station C.

Although the embodiments of the present invention have been described in detail, it will be understood that the present invention is not limited to the above-described embodiments, and various modifications in design may be made without departing from the spirit and scope of the invention defined in claims.

The invention claimed is:

1. A machining apparatus comprising a work removing means, a rotating means for rotating a removed work, a work transporting means, and a work machining means, in which
    a work supported vertically is removed from a stocker disposed on one side of a machining area by said removing means,
    the removed work is rotated through 90 degrees in a thickness-wise direction by said rotating means to a horizontal attitude, and
    the horizontalized work is positioned in the machining area by the transporting means, where it is machined, after completion of the machining, the machined work is transported from the machining area, wherein
    said apparatus further includes a stocker-rotating means adapted to support said stocker and rotate it through 180 degrees with respect to a vertical axis.

2. A machining apparatus according to claim 1, further including a further set of a removing means, a rotating means and a transporting means, which are disposed on the other side of said machining area.

* * * * *